United States Patent [19]
Laurent et al.

[11] 3,802,898

[45] Apr. 9, 1974

[54] HYDROCARBON CONCRETE MIXTURE

[75] Inventors: Pierre Laurent, Paris; Jean-Francois Clement, Le Havre; Joseph Quiquerez, Sainte-Adresse, all of France

[73] Assignee: Compagnie Francaise de Raffinage, Paris, France

[22] Filed: Feb. 18, 1972

[21] Appl. No.: 227,626

Related U.S. Application Data

[63] Continuation of Ser. No. 875,537, Nov. 10, 1969, abandoned.

[30] Foreign Application Priority Data
Nov. 13, 1968  France .......................... 68.173551

[52] U.S. Cl............................ 106/280, 94/20, 94/23
[51] Int. Cl............................................ C09d 3/24
[58] Field of Search ......................... 106/273–284, 106/38.8; 94/19–23

[56] References Cited
UNITED STATES PATENTS
2,037,147  4/1936  Radcliff .......................... 105/281 X
3,239,361  3/1966  Speer ................................. 106/274

FOREIGN PATENTS OR APPLICATIONS
387,324  1/1933  Great Britain ..................... 106/281

Primary Examiner—Harry Wong, Jr.
Attorney, Agent, or Firm—Curtis, Morris & Safford

[57] ABSTRACT

A mixture consisting of a hydrocarbon binder, an aggregate and a filler is disclosed. The filler is preferably an organic filler comprising at least 80 percent by weight carboids. The preferred organic filler is a petroleum coke of coal coke obtained by the delayed coking or fluid coking process.

2 Claims, No Drawings

HYDROCARBON CONCRETE MIXTURE

This is a continuation of application Ser. No. 875,537, filed Nov. 10, 1969, now abandoned.

The present invention relates to new hydrocarbon concrete mixture. More particularly it concerns hydrocarbon concretes containing a novel filler with substantially improved mechanical properties.

In the following description the expression hydrocarbon concrete or hydrocarbon mix designates a mixture of binder, filler and aggregate in any proportions. The expression binder-complex designates the aggregate binding phase and is formed of the sum of the binder phase and the filler phase.

The expression, binder, designates either bitumen, when the binder is of petroleum origin, or tar and pitch when the binder comes from coal. It may also be a mixture of bitumen tar and pitch, or combinations of these products with plastic products obtained from high organic polymers such as, for instance, tar plus polyvinylchloride or bitumen plus rubber latex (natural or synthetic).

The filler, the nature of which is specified in the description of the invention, consists of particles which, before being introduced in the hydrocarbon mix, are less than 80 $\mu$ in their largest dimension. The proportion of particles whose size is less than 5$\mu$ is generally less than 5 percent by weight.

The aggregate consists of a combination of gravel, pebbles and sand, the particle size of which is between that of fine sand and that of coarse gravel, i.e. granular material which, although retained by screens of AFNOR 20 mesh, is not retained by screens of a mesh between 21 and 42.

For certain particular uses, solid materials or mastics which are moldable or deformable when hot are used and these do not contain aggregates. These products consist of a hydrocarbon binder, as defined above, and a filler.

It is known that the role of the filler in a hydrocarbon mix is twofold. First, it results in a thickening of the binder and an increase in the softening point and decrease in the penetrability of the binder complex. It therefor tends to decrease the susceptibility to temperature by improving the mechanical properties of the mix at higher temperatures without changing its low temperature behavior. Secondly, the binder-complex formed assures the filling of voids in the aggregate. It closes the mix and assures good compactness, thereby resulting in an improvement of the mixtures resistance to changes in climate and the action of water.

The properties of the mixture and its performance characteristics depend on the filler used and on the chemical properties of the binder and the aggregate. The fillers most generally used are limestone, fly ash, slags, limes, powdered coal and powdered vulcanized rubber. Asphaltic rocks and sulfur may also be used. The amount of filler introduced depends on the relative proportions of binder and aggregate as well as on the intended use of the hydrocarbon mix.

The primary object of this invention is to provide a hydrocarbon mix which contains novel fillers which may be used in high concentration.

Another object of this invention is to provide a hydrocarbon mix consisting of a hydrocarbon binder, an aggregate and a filler, the filler being characterized in that it consists in whole or in part of an organic component comprising at least 80 percent by weight carboids.

Another object of this invention is to provide a hydrocarbon binder-complex consisting of a hydrocarbon binder and a filler, the said filler being composed in whole or in part of an organic component comprising at least 80 percent by weight carboids.

By organic component is meant a substance comprised of carbon materials, all the properties of which are defined before introduction into the mix or into the binder. The organic component is the critical component of the hydrocarbon mix. It is a solid at ordinary temperatures and contains at least 80 percent by weight carbon. It has carbon/hydrogen weight ratio of more than 12 and may also contain sulfur, oxygen, nitrogen and, in smaller amount, metals such as vanadium. The presence of these elements in small amounts does not change the properties of the mixtures or binder-complexes of the invention.

The organic components used in the mixes or binder-complexes must have a high concentration of carboids, i.e. compounds insoluble in carbon disulfide. It is necessary that the filler remain in the same state in the final product and not solubilize in the binder in too large an amount. This would occur if the organic filler comprised less than about 80 percent by weight carboids.

The organic components need not be the only filler component in the hydrocarbon concrete. The filler may also include a fine-sand or limestone.

Crushed coke constitutes a particularly interesting organic filler. Coke is composed almost exclusively of carboids, and therefore is practically insoluble in the binder.

There are unexpected properties and advantages in hydrocarbon concretes containing fillers composed in whole or in part of coke. The advantage of using coke filler instead of fillers customarily employed, (fine sand filler, limestone filler, etc.) is in the low density of the coke filler. For the same weight, the coke filler takes up substantially twice as much space as sand or limestone filler. The use of coke filler is therefore very advantageous from an economic standpoint. This advantage is furthermore accentuated by the fact that the mechanical properties of a hydrocarbon mix containing a coke filler are at least equivalent, for the same volume of filler, to those of a hydrocarbon mix containing a conventional filler. The coke filler also imparts to the hydrocarbon mix or the binder-complex a water-repellence which makes them more resistant to attack by atmospheric agents.

The coker filler furthermore makes it possible to "close" the hydrocarbon mix, i.e. to reduce the percentage of voids. This is done by increasing the proportion of filler in the mix. Overfilling with coke is of particular interest due to the low density of the coke. The coke also imparts to the mix a resistance to atmospheric agents which is greater than that obtained with ordinary fillers.

The coke is crushed, for instance, in a ball mill, and this may be followed by screening. The organic filler may be selected from among any known cokes. The petroleum cokes, obtained for example, by "fluid coking" and "delayed coking" processes are suitable, as well as coal cokes.

The hydrocarbon binders of the hydrocarbon mixes may be of various origin. Binders of petroleum origin are obtained, for example, by direct distillation, by reconstitution from deasphalting pitches or vacuum distillation residue or by reconstitution from blown products. The method of obtaining binders by the direct distillation is used when the crude oil is very rich in asphaltic products. This is true of the Venezuelan crude oils. The binders may also be natural asphalts having a relatively high content of mineral substances. They may also come from tars such as coal, wood, lignite and peat tar residues. A mixture of at least two binders is also suitable as are combinations of these products with plastics obtained from high organic polymers.

The aggregate used in the production of a hydrocarbon mix must be suitable for the use which is to be made of it. Particle size distribution has an optimum value specific to each use.

The relative proportions of binder, filler and aggregate depend on the uses for which the hydrocarbon mixes are intended. A bituminous concrete for a surface coat may, for example, contain per one hundred parts by weight of aggregate and filler, about 93 parts of aggregate, 7 parts of filler and 6.5 parts of binder, the filler being partially or entirely an organic filler comprising 80 percent or more by weight of carboids. It is desirable to use a binder-complex which is very rich in filler for the manufacture of tightening skirts, cements, special anti-corrosion coatings and various coverings which are resistant to punching, etc.

The invention is illustrated by the following Examples.

EXAMPLE I

Bituminous mixes of the following formula, expressed in weight per hundred parts of aggregate and filler, are produced:

| stone chips | 8/12[1] | 20% |
|---|---|---|
| stone chips | 5/8[2] | 20% |
| stone chips | 3/5[3] | 20% |
| – Sand 0/3 defillerized[4] | | 31.8% |
| – Filler | | 8.2% |
| – Bitumen 80/100 | | 6.2 parts by weight |

[1]stone chips of a particle size wherein the largest dimension of each particle is not less than 8.00 mm and not more than 12.50 mm.
[2]stone chips of a particle size wherein the largest dimension of each particle is not less than 5.00 mm and not more than 8.00 mm.
[3]stone chips of a particle size wherein the largest dimension of each particle is not less than 3.15 mm and not more than 5.00 mm.
[4]sand of a particle size wherein the largest dimension of each particle is not less than 0.080 mm and not more than 3.15 mm.

The aggregate comes from the Meilleraie quarries. The bitumen has a penetration of 80/100, expressed in 1/10 mm (test carried out at 25°C with a load of 100 grams applied for 5 seconds, the needle being in accordance with NFT Standard 6004) and is obtained by fluxing propane deasphalting pitch with an aromatic extract of oil in furfural. The filler, depending on the mix in question, contains variable proportions of sand, limestone and coke. The coke filler obtained after crushing and screening coke produced by the "fluid coking" process has the following weight composition:

| – C | 87.25% |
|---|---|
| – H | 2.30% |
| – S | 5.91% |
| – C/H | 38 (by weight) |
| – H/C | 0.31 (in gram atoms) |

It is noted that the coke does not undergo fusion.

The hydrocarbon mixes, in the form of test pieces of 1 kg compacted to 120 kg/cm$^2$ in accordance with the standard defined by the Laboratoire Central des Ponts and Chaussees, are subjected to two tests. The mechanical strength is measured as compressive strength under two conditions: (1) after the test pieces have been in air for 7 days at 18°C; and (2) after the test pieces have been in water for 7 days at 18°C. The description of these tests is set forth in great detail in Operating Method B 14 of the operating methods of the Laboratoire Central des Ponts and Chaussees, pages 681–697, published by Duriez, 2nd edition, 1962.

In Table I are summarized the compositions of and the results of the compressive strength tests of different mixes. The compositions of aggregate and filler are given per hundred parts by weight of aggregate and filler. The amount of binder is likewise given in parts by weight. The volume occupied by the total filler has been indicated per hundred parts by volume of aggregate plus filler. The notations "8/12, 5/8, 3/5 and 0/3" have the meanings given above in Example I.

TABLE I

| Test Number | Control | 1 | 2 | 3 |
|---|---|---|---|---|
| COMPOSITION | | | | |
| Stone chips 8/12 | 20% | 20% | 20% | 20% |
| Stone chips 5/8 | 20% | 20% | 20% | 20% |
| Stone chips 3/5 | 20% | 20% | 20% | 20% |
| Sand 0/3 defillerized | 31.8% | 31.8% | 31.8% | 31.8% |
| Sand filler | 6.2% | 6.2% | — | — |
| Limestone filler | 2% | — | 2% | — |
| Coke filler | — | 2% | 6.2% | 8.2% |
| Total filler (% by vol.) | 8.2% | 10.2% | 14.4% | 16.4% |
| Bitumen 80/100 | 6.2 | 6.2 | 6.2 | 6.2 |
| COMPRESSIVE STRENGTH | | | | |
| After 7 days in air at 18°C; C (kg/cm$^2$) | 66 | 70 | 99 | 104 |
| After 7 days in water at 18°C: I (kg/cm$^2$) | 45 | 51 | 82 | 104 |
| I/C | 0.69 | 0.73 | 0.83 | 1 |

Table I shows that the coke filler, when used in the same quantities, by weight, as the sand or limestone filler, results in a very substantial increase in the compressive strength of the mix.

EXAMPLE II

Two hydrocarbon mixes are produced by the method described in Example I. Their composition is set forth in Table II as are the results of the compressive strength tests. The two mixes have substantially the same amount of filler, expressed by volume. The notations "8/12, 5/8, 3/5 and 0/3" have the meanings given above in Example I.

TABLE II

| Test Number | CONTROL II | 4 |
|---|---|---|
| COMPOSITION | | |
| Stone chips 8/12 | 18.8% | 19.6% |
| Stone chips 5/8 | 18.8% | 19.6% |
| Stone chips 3/5 | 18.8% | 19.6% |
| Sand 0/3 defillerized | 35.8% | 37.6% |
| Sand filler | 5.8% | — |
| Limestone filler | 1.9 | — |
| Coke filler | — | 3.6% |
| Total filler (% vol.) | 7.7% | 7.2% |
| Bitumen 80/100 | 6.2 | 6.2 |
| COMPRESSIVE STRENGTH | | |
| After 7 days in air at 18°C: C (kg/cm$^2$) | 60 | 56 |
| After 7 days in water at 18°C: I (kg/cm$^2$) | 51 | 51 |
| I/C | 0.85 | 0.90 |

It can be seen that the compressive strengths are close. However, the mix which contains a coke filler better withstands the immersion test, which means improved behavior with respect to atmospheric agents.

EXAMPLE III

This example illustrates the overfilling of hydrocarbon mixes.

Two mixes are prepared by the method described in Example I, but using substantially larger quantities of filler. The two mixes have the same amount of filler expressed by volume. In Table III are summarized the compositions and the results of the compressive strength tests. The notations "8/12, 5/8, 3/5 and 0/3" have the meanings given above in Example I.

TABLE III

| Test Number | CONTROL III | 5 |
|---|---|---|
| COMPOSITION | | |
| Stone chips 8/12 | 17% | 19% |
| Stone chips 5/8 | 17% | 19% |
| Stone chips 3/5 | 17% | 19% |
| Sand 0/3 defillerized | 33% | 35% |
| Limestone filler | 16% | — |
| Coke filler | — | 8% |
| Total filler (% vol.) | 16% | 16% |
| Bitumen 80/100 | 6.2 | 6.2 |
| COMPRESSIVE STRENGTH | | |
| After 7 days in air at 18°C: C (kg/cm$^2$) | 67.2 | 68 |
| After 7 days in water at 18°C: I (kg/cm$^2$) | 65 | 68 |
| I/C | 0.96 | 1 |

Table III shows that coke contributes an increase in strength to the mix which the limestone filler does not.

What is claimed is:

1. A process for the preparation of a hydrocarbon concrete mixture consisting essentially of a binder, a granular aggregate and a filler, and the application of that mixture comprising the steps of: forming a uniform mixture of (1) a bituminous hydrocarbon binder in about 6.2 parts by weight per 100 parts of aggregate and filler; (2) a petroleum coke filler in from 2 to 8.2 parts by weight per 100 parts of aggregate and petroleum coke filler, said petroleum coke filler having a low density and a carbon/hydrogen weight ratio of more than 12 and being essentially insoluble in carbon disulfide and having a particle size less than 80 microns and wherein less than 5 percent by weight of the particles have a maximum dimension of less than 5$\mu$; and (3) a granular aggregate including gravel, pebbles and sand of a particle size greater than 80 microns; and applying the mixture so formed.

2. A hydrocarbon concrete mixture consisting essentially of a binder, a granular aggregate and a filler, having improved mechanical properties, wherein said mixture is prepared by a process of: forming a uniform mixture of (1) a bituminous hydrocarbon binder in about 6.2 parts by weight per 100 parts of aggregate and filler; (2) a petroleum coke filler in from 2 to 8.2 parts by weight per 100 parts of aggregate and petroleum coke filler, said petroleum coke filler having a low density and a carbon/hydrogen weight ratio of more than 12 and being essentially insoluble in carbon disulfide and having a particle size less than 80 microns and wherein less than 5 percent by weight of the particles have a maximum dimension of less than 5$\mu$; and (3) a granular aggregate including gravel, pebbles and sand of a particle size greater than 80 microns.

* * * * *